Dec. 1, 1959   C. A. SIMMONS, SR   2,915,143
AUTOMOBILE LIFT
Filed Oct. 23, 1953   9 Sheets-Sheet 1

Inventor
Charles A. Simmons Sr.
by Davis, Hoxie & Faithfull
Att'ys.

Dec. 1, 1959     C. A. SIMMONS, SR     2,915,143
AUTOMOBILE LIFT Filed Oct. 23, 1953     9 Sheets-Sheet 7

Fig. 7

Dec. 1, 1959 C. A. SIMMONS, SR 2,915,143
AUTOMOBILE LIFT
Filed Oct. 23, 1953 9 Sheets-Sheet 9

Inventor
Charles A. Simmons Sr.
by Davis, O'Brien, Faithfull
att'ys.

United States Patent Office 2,915,143
Patented Dec. 1, 1959

2,915,143

AUTOMOBILE LIFT

Charles A. Simmons, Sr., Albany, N.Y., assignor to Simmons Industries, Inc., Menands, N.Y., a corporation of New York Application October 23, 1953, Serial No. 387,850

4 Claims. (Cl. 187—8.41)

The automobile which in the course of the last forty-five years has transformed this country into a "nation on wheels" is now slowly strangling the usefulness of cities as centers of transportation and commerce. As to its vivid effects, it is only necessary to note the recent rapid development and growth of suburban shopping areas and the emigration of many former city dwellers to the suburbs. The ultimate result of these trends, unless reversed, will be the eventual bankrupting of large cities, in the larger of which the business values in the heart thereof are already on the decline, the volume of retail trade transacted in the downtown department stores diminishing, and the related income derived by the city in the form of real estate and sales taxes dwindling proportionately. At the same time, these cities have been faced with the problem of rising costs and increased consumption of the city-sponsored services and unless these dynamically opposed trends can be reversed it will be impossible for large cities to survive.

If the downtown areas are to regain their dominancy in the retail trade, it is necessary that the parking problem in large cities, which increases daily in direct proportion to the ever-increasing number of automobiles manufactured, be solved. Heretofore the haphazard measures for relieving the congestion of the streets of American cities has been directed towards the construction of isolated parking lots and super-garages which have thus far proved ineffectual as, in the early morning and late afternoon rush hours, the thoroughfares leading to these concentrated parking localities become heavily congested and, instead of solving the parking problems, these peak rush hour traffic loads only serve to make the overall traffic problem more intolerable.

Objects of this invention are to provide apparatus which greately increase the capacity of available parking areas and garages, which doubles the available parking facilities of a city street without interfering with the flow of traffic, which is rugged and troublefree, which does not require any particular skill to operate, and which is simple and economical to construct.

These objects are obtained by an automobile lift which, according to the present invention, comprises a substantially vertical column which may be mounted by either fixing or rotatably securing the lower end of the column to a base. Reciprocatingly attached to the sides of the column are one or more independently movable platforms, each of which is adapted to hold an automobile. Power-operated means, preferably hydraulic, are provided for moving the platforms axially of the column selectively to raise either of the platforms to an elevation sufficient so that another automobile can be driven or parked beneath the raised platform.

These and other objects and aspects of the invention will be apparent from the following description of several specific embodiments of the invention which refer to drawings wherein.

Figure 1:
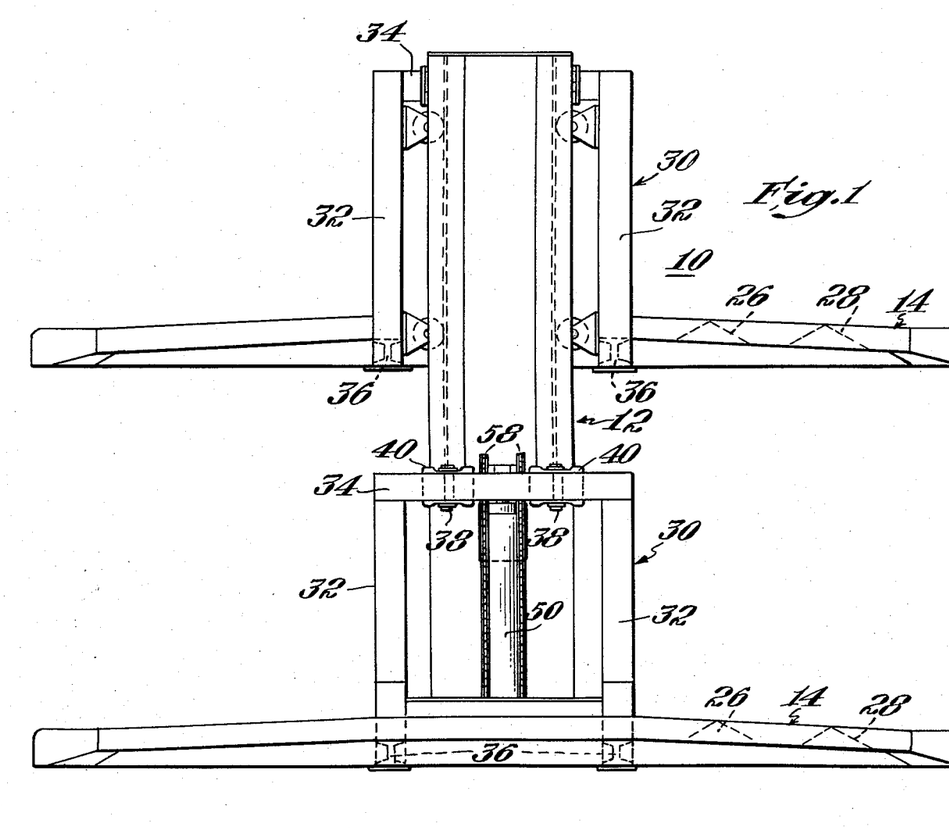
Fig. 1 is a side elevation view of a first embodiment of the automobile lift.
Figure 2:
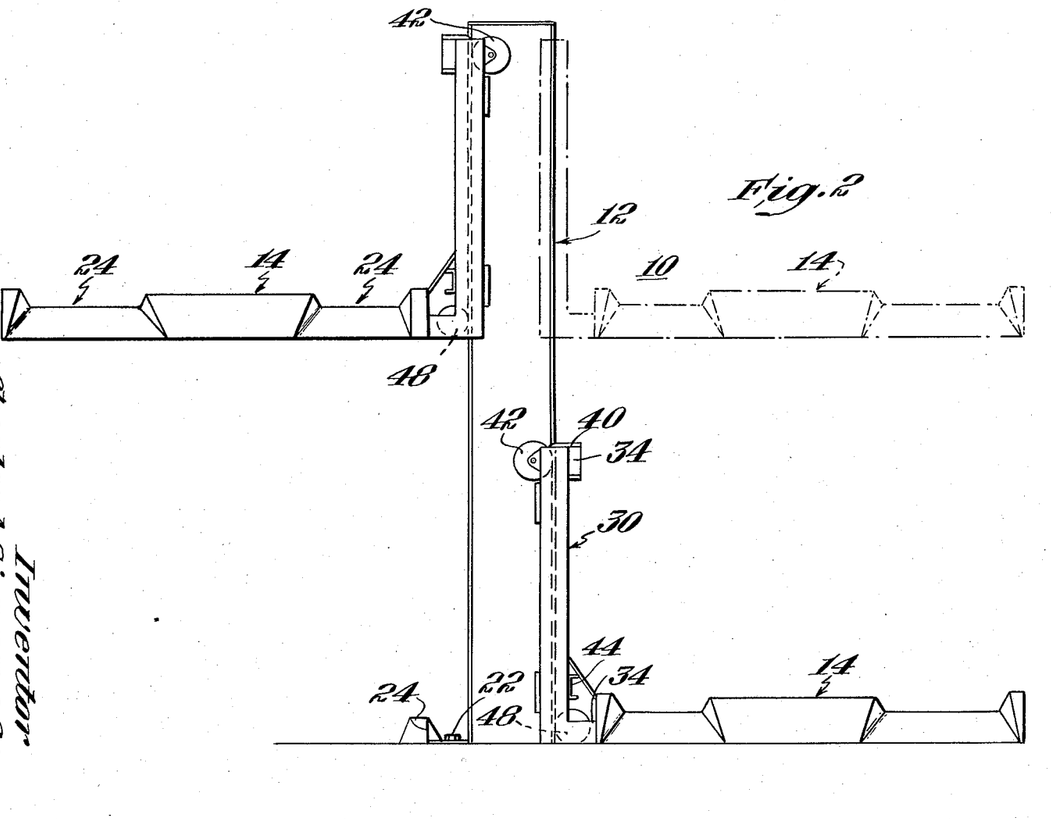
Fig. 2 is an end elevation view.
Figure 3:
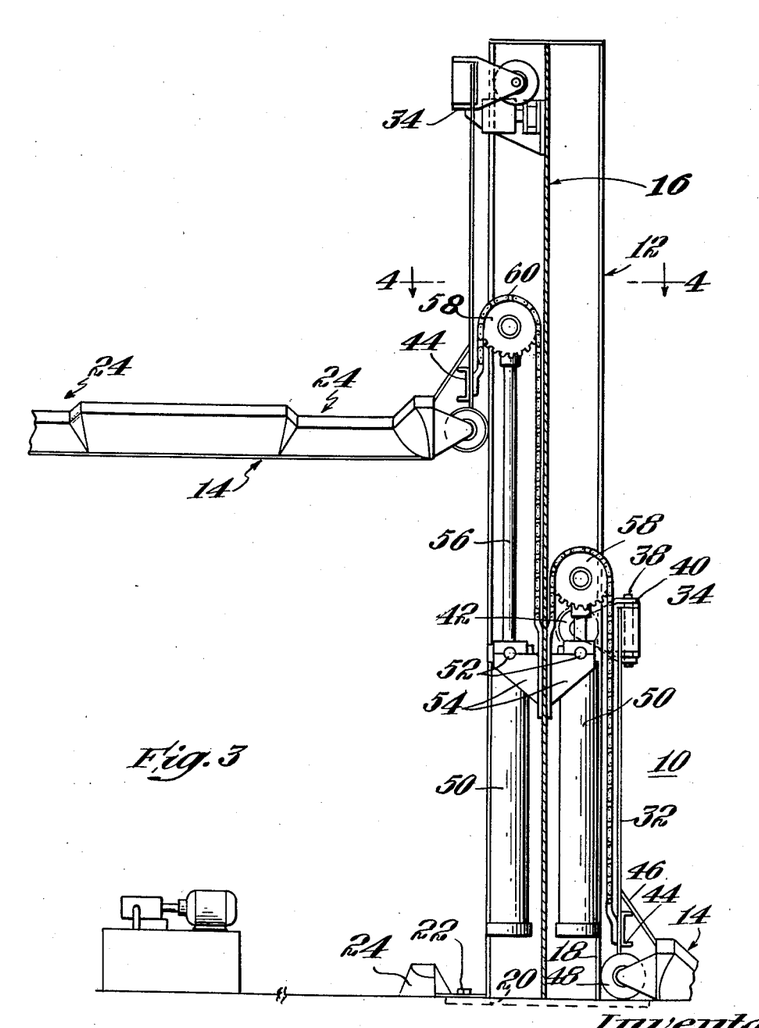
Fig. 3 is an end elevation view with portions broken away.

The automobile lift 10 shown in Figs. 1 to 3 comprises a vertical column 12 upon each of two opposing sides of which are reciprocally mounted a respective platform 14. As can best be seen in Fig. 4, the column 12 is preferably fabricated of a centrally disposed I-beam 16 whose flanges are welded respectively to the webs of two transverse I-beams 18. The lower ends of the I-beams 16 and 18 forming the column 12 are welded to a base plate 20 (Fig. 3) which in turn is secured to a supporting foundation by bolts 22. A wheel guide 24 extends from the plate 20 on either side of the column 12 acting as a bumper to prevent accidental striking of the column 12 by automobiles which might accidentally be driven too near thereto.

Figure 5:
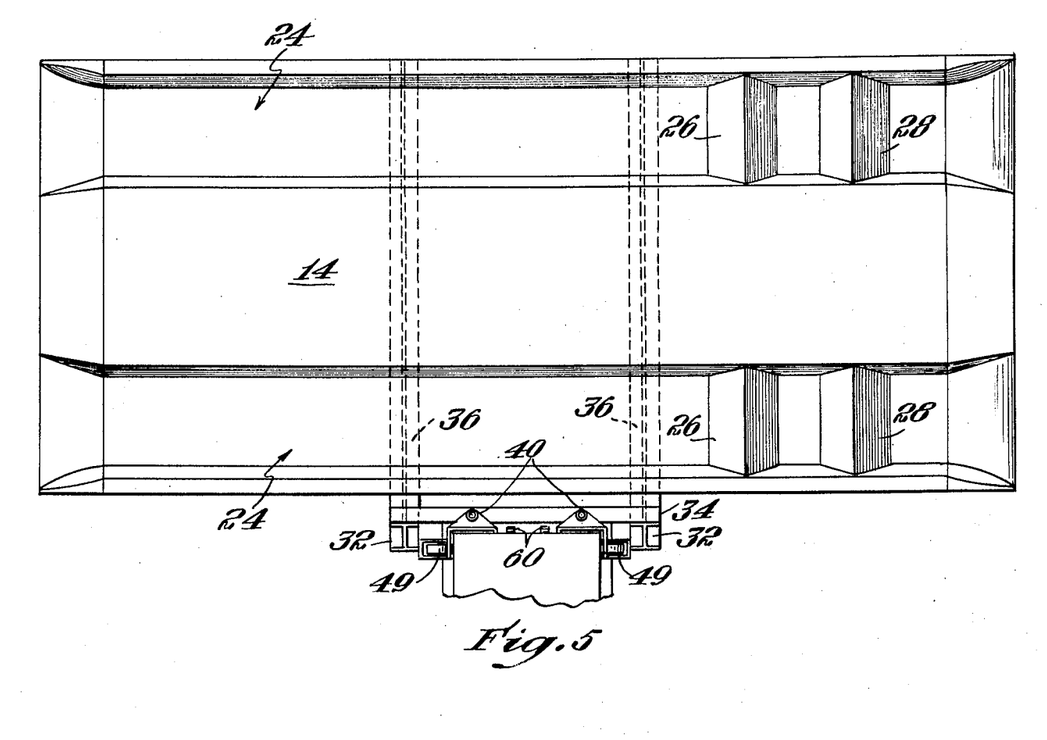
Fig. 5 is a plan view of one of the automobile platforms.

As mentioned above, an automobile-supporting platform 14 is located on either side of the column 12, although it is to be understood that it is possible to eliminate one of the platforms in the case of limited space or other restriction. As is best shown in Fig. 5, each of the platforms 14 is made imperforate so that any oil or grease which might drip from an automobile supported thereupon will be caught and restrained. Extending lengthwise of each platform 14 are two depressed channels 24 spaced to accommodate the wheels of an automobile, the sides of the channels being inclined and flared outwardly at the ends thereof, as shown in Fig. 2, to facilitate the driving of an automobile upon the platform. To center the automobile lengthwise of the platform 14 and to prevent it from rolling off either end of the platform if the brakes should not be set, each channel 24 is provided with two transverse, spaced protuberances 26 and 28 which are disposed crosswise of the channel to engage the opposite sides of a corresponding rear wheel.

Figure 4:
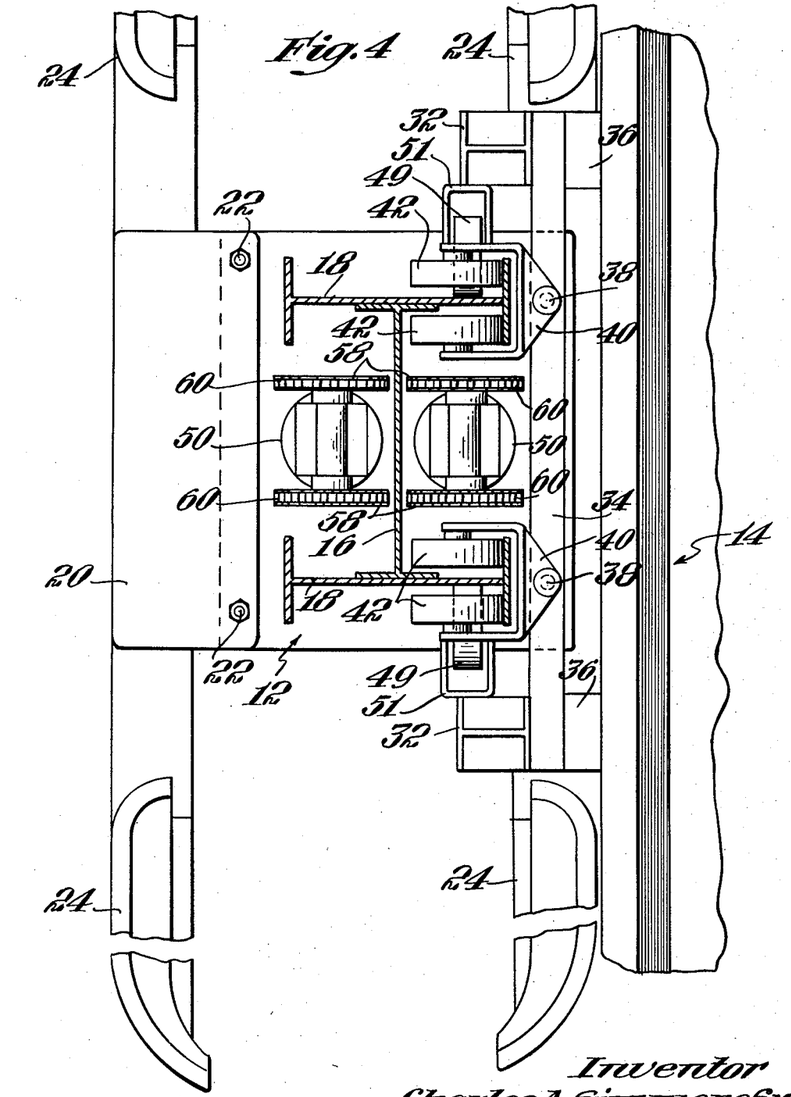
Fig. 4 is a fragmentary sectional view of lines 4—4 of Fig. 3.

The side of each platform 14 adjacent the vertical column 12 is attached to a supporting means or framework 30 (Fig. 1) comprising the spaced vertical members such as the I-beams 32, the upper ends of which are joined by a horizontal channel member 34. The lower ends of the I-beams 32 are welded to the respective ends of two transverse I-beams 36 which extend underneath and give additional stiffening and support for the platform 14. Pivotally connected to the transverse channel member 34 by pins 38 are two U-shaped brackets 40, the arms of each of which are provided with stub shafts whereupon are rotatably mounted rollers 42 to bear against the inner faces of the outer flange of the column I-beams 18, as can be seen in Fig. 4. The lower end of the supporting frame 30 is further stiffened by a transverse channel 44 (Fig. 3) and a guard plate 46 interposed between the frame and the edge of the platform 14. A lower set of rollers 48 is rotatably carried upon the inner edge of platform 14 so that the rollers bear against the outer face of the flange of the vertical I-beam 18. It will be evident that with the above described structure, when an automobile is driven upon the platform, the moment resulting from such loading is resisted by the rollers 42 and 48 which at the same time permit a reciprocal vertical movement of the platform with respect to the column 12. Such vertical movement is obtained by power-operated means such as will be described in detail below. Lengthwise movement of the platform 14 is controlled by rollers 49 rotatably carried in U-shaped brackets 51 which are welded to the vertical I-beam members 32 of the frame 30 so that the rollers bear against the web of the vertical I-beam 18.

Although it is possible to obtain the above mentioned reciprocal movement of the platforms 14 by any of several mechanical, electrical or hydraulic means such as will be readily evident to one skilled in the art, I have found a hydraulically operated cylinder assembly 50 arranged as shown in Fig. 3 provides a smoothly operating simple power source which requires a minimum of attention and maintenance. An independently operable cylinder assembly 50 is provided respectively for each of the platforms 14 so that the platforms are selectively operable. Within each cylinder is a closely fitting piston which is movable in either direction axially of the enclosing cylinder by the introduction and exhausting of operating fluid in a well known manner in the art; the cylinder and piston comprising the hydraulic assembly being available commercially so that the details thereof will not be described further. The cylinder assemblies 50 are provided with trunnions 52 which are mounted in a pair of yokes 54 fastened to the column 12 to permit a pivotal movement of the assemblies. Alternatively, the cylinder may be mounted by providing a base plate on the cylinder which is bolted directly to the upper surface of the column base plate. With this arrangement it is possible to have the loads on the piston and cylinder assembly transmitted directly to the floor plate of the machine. At the end of a rod 56 opposite that attached to the piston is rotatably carried a pair of idler pulleys 58 which preferably are spur gears, each of which has teeth about its periphery.

Running over the pulleys 58 are two flexible tension members, such as the chains 60, one end of each of which is permanently tied to the web of the central column I-beam 16. The other end of each of the chains 60 is fastened respectively to the transverse channel 44 of the platform frame 30 so that the platform is moved along the column 12 as the corresponding piston rod 56 is moved by the admission or exhausting of working fluid from the bottom of the cylinder assembly 50 as the case may be. Because of the mechanical advantage gained with this arrangement, it will be evident that the distance the platform 14 moves is twice the travel of the rod 56, so that the required stroke of the piston to obtain a given movement of the platform is reduced by half.

Figure 10:
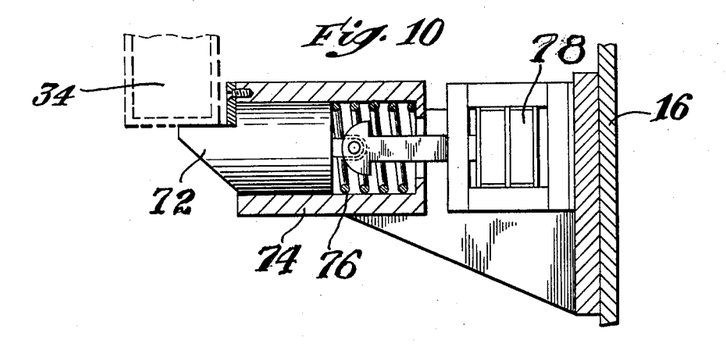
Fig. 10 is an elevation view in partial section showing the details of a detent for latching the platform in its elevated position.

When in the elevated position, the platform 14 is mechanically locked in place to preclude the possibility of the loaded platform accidentally descending due, for example, to a failure of the hydraulic system. This is accomplished by a latching device (Fig. 10) comprising a beveled plunger 72 which is retractable in a recess in a housing 74 against the force exerted by a spring 76. The housing 74 is attached to the web of the I-beam 16 to bring the beveled end of the plunger 72 into the path of the channel member 34 so that the plunger is depressed into the housing 74 as the platform 14 is raised. After the channel member 34 has cleared the plunger 72, the spring 76 again extends the plunger so that it acts as a detent which positively locks the platform in its raised position. An electric solenoid 78, which is energized from the circuit of an electrically operated valve controlling the downward movement of the platform 14, is provided to retract the plunger 14 automatically when the platform is to be lowered.

It will be observed that the column 12 is a beam structure comprising a main vertical plate 16, secondary vertical plates 18 spaced from each other and extending in opposite directions from the lateral edges of the main plate, and flanges at the lateral edges of the secondary plates, each supporting means or framework 30 being located opposite the side of the column formed by the pair of flanges on corresponding lateral edges of the secondary plates 18. The upper and lower rollers or supporting members 42 and 48 of each supporting means engage the inner and outer faces respectively of the adjacent flanges, thereby resisting the turning moment exerted by the platform 14 on the supporting means.

Figure 6:
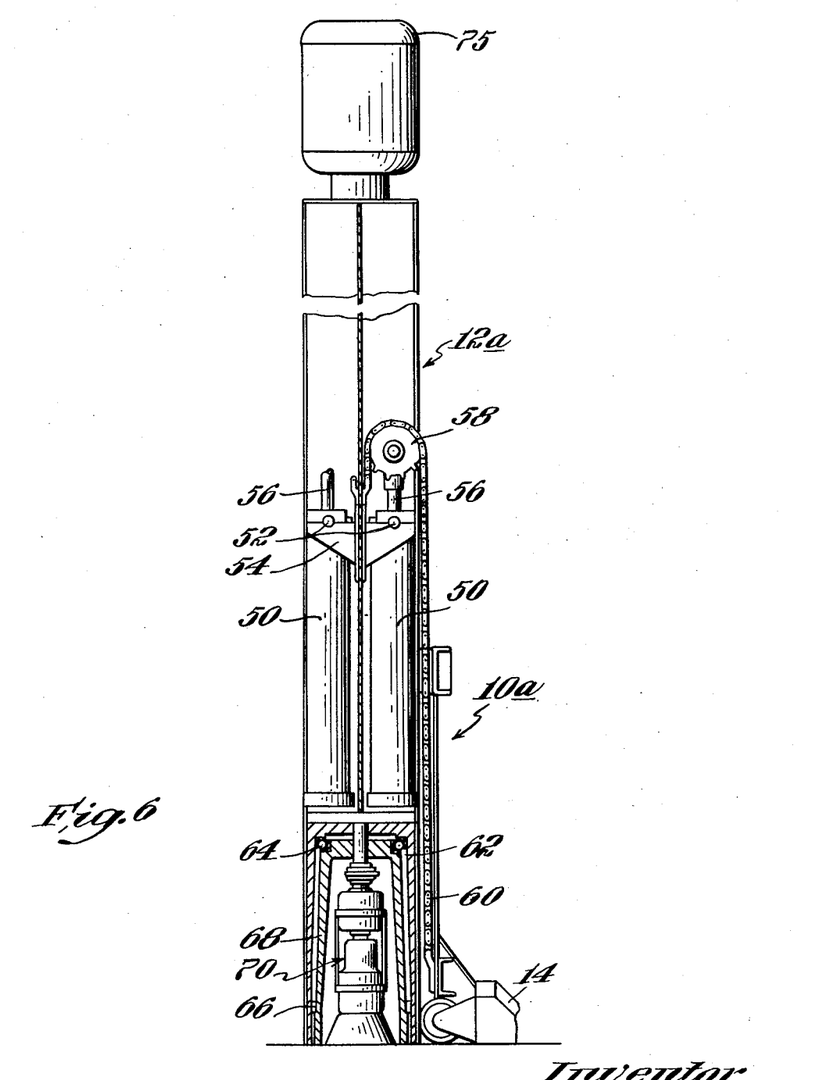
Fig. 6 is an end elevation view in partial section of a second embodiment of the invention.

In Fig. 6 is shown a second embodiment 10a of the invention wherein the vertical column 12a has been modified, as will be described below, so that the entire assembly can be rotated about the vertical axis of the column, the structure otherwise being essentially similar to that shown in Figs. 1 and 5 so that the details thereof will not be described further. The lower end of the column 12a of the rotatable lift 10a terminates in a sleeve member 62 carried by two large anti-friction bearings 64 and 66. These bearings are seated upon a hollow supporting pedestal 68. Within the pedestal 68 is located a hydraulic motor and speed reducer unit 70 whose output shaft extends through an aperture in the upper end of the pedestal to connect with the closed end of the sleeve member 62 so that operation of the unit rotates the column 12a and associated platforms 14. An alternate construction is to have the upper end of the column suspended by means of a cone and large anti-friction bearing supported by means of a central pipe. The two beams to which the platforms are affixed revolve about this central pipe or column which in turn remains stationary.

Figure 9:
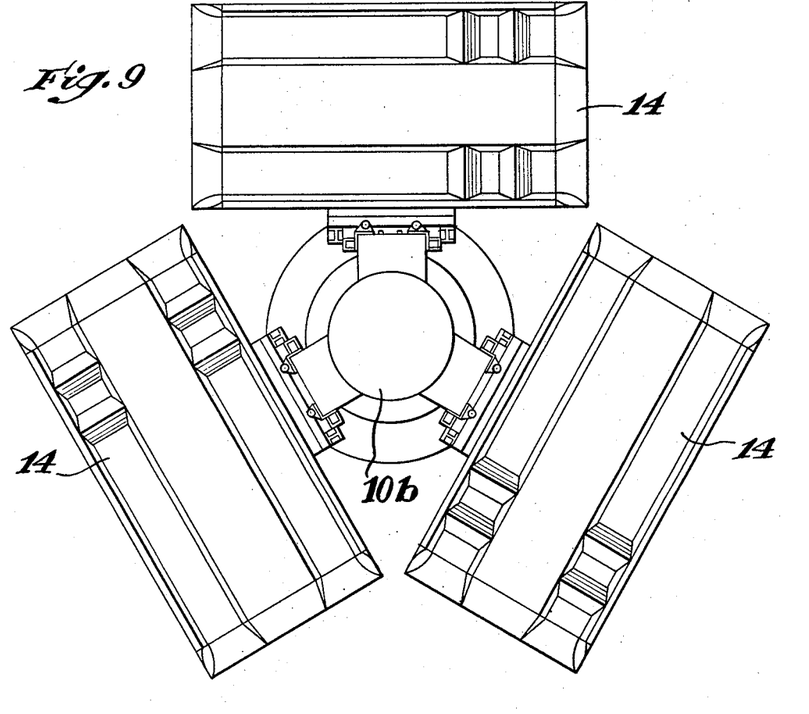
Fig. 9 is a plan view of a third embodiment of the invention for supporting three automobiles.

When individual lifts are used in isolated locations, a power dome 75 such as is shown in Fig. 6 is mounted upon the top of the column 12a. Within the dome 75 is contained an electric motor driving a high pressure hydraulic pump, a relief valve, and a hydraulic fluid reservoir. Conduits in the form of tubing or pipe (not shown) lead from the power dome 75 to the hydraulic cylinder assemblies 50 and, in the case of the rotatable lift 10a, to the hydraulic motor 70 in the pedestal 68. Interposed in the conduits are control valve (not shown) which are preferably electrically operated so that the movements of the lift can be controlled electrically from a panel board. If, as in a garage or parking lot, a plurality of lifts are installed, a common centrally located source of operating fluid can be used which, if preferred, can be the pneumatic system already installed in many garages. A third embodiment of this invention is shown in Fig. 9 wherein the basic structure and operation is essentially similar to that described above for the two-platform revolving model with the exception that the central column 10b has been altered so as to allow the mounting of three platforms 14 spaced at 120 degree intervals. This embodiment of the automobile lift provides space for the storage of three cars in the air.

The non-revolving model of the lift machine is particularly adapted to use in existing parking lots and garages. In such installations, it is possible to place individual lift units side by side so that effectively their ground space is doubled, and as many cars are parked in the air as are parked on the ground.

When applied to use in a parking lot, the lift conforms to the set pattern habits to which we have grown accustomed. The loading or unloading of an elevated automobile presents no problem. It is customary to park automobiles in lots today in such a manner that it becomes necessary to move one or more automobiles in order to remove one that has been parked for some time. When removing an automobile stored on the elevated platform, it is merely necessary to move the automobile located beneath the platform, lower the platform, and remove the desired automobile. This automobile would then be driven away, and the automobile originally located beneath the platform would now be stored on the same platform. Such operations would be under the control of the parking lot attendant. He would have sole possession of the master key used in operating the control switches of the individual lifts. An automobile to be parked would be delivered to the attendant. He would give the driver a ticket in receipt for the automobile, and then park the automobile himself. When the driver returned, he would hand the attendant his ticket, and the attendant would then deliver the parked automobile to its owner. None of the mechanics of the present-day parking lot business has been changed—the lift has merely increased the net available income to the parking lot owner by increasing the net available storage space.

Figure 7:
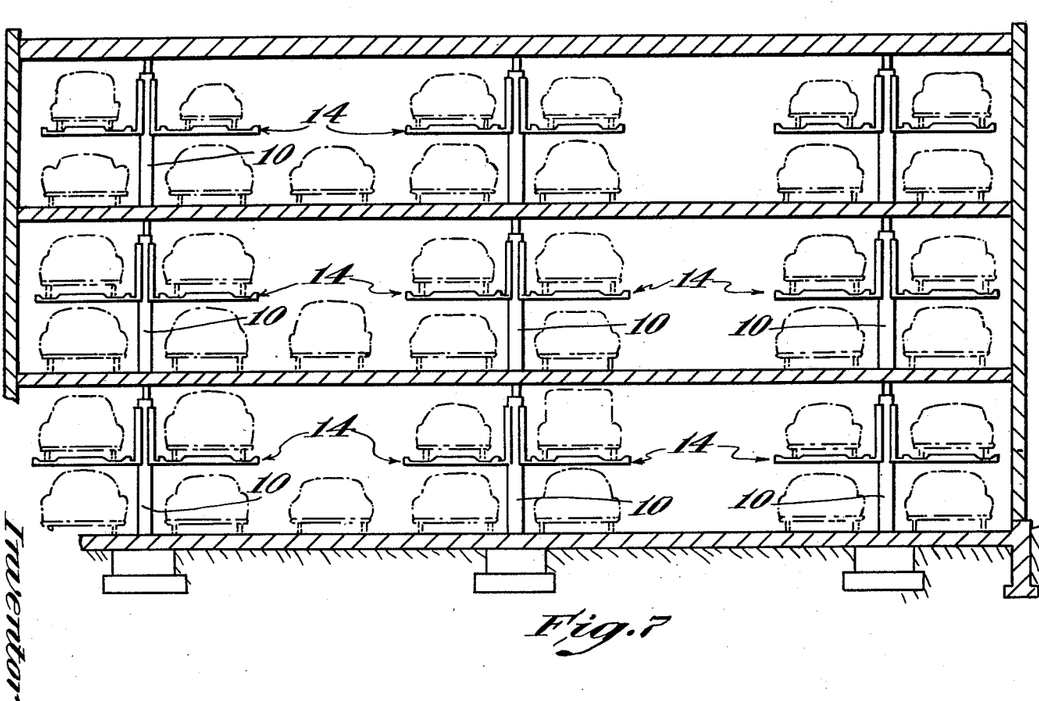
Fig. 7 is an elevation view with portions broken away illustrating the installation of the automobile lifts in a multi-storied garage.

The structural steel work used to erect any type of building including a garage is chosen with two distinct criteria in m nd—maximum strength for the given conditions, and minimum expense—the net result of these two criteria being the placing of a limit as to the amount of live load that any floor of an existing building may be expected to carry. When using the lift in such a garage, it is possible to place the individual units directly above one another on successive floors, as shown in Fig. 7. Between the top surface of the main lift column of any one unit and the ceiling directly above, a jack and plate can be located, the individual columns of the lift units then becoming effectively a continuous column. The increased loading from having automob les located on the elevated platforms is thus transmitted directly through this continuous column down to a concrete foundation located below the first floor unit. The result of this application of the lift is that the effective floor loading of the individual stor'es has been increased without over-loading the structural steel work of the building. The only prerequisite for this application of the lift is that there be a minimum of twelve feet of ceiling height in order to accommodate the automob les in elevated position.

Figure 8:
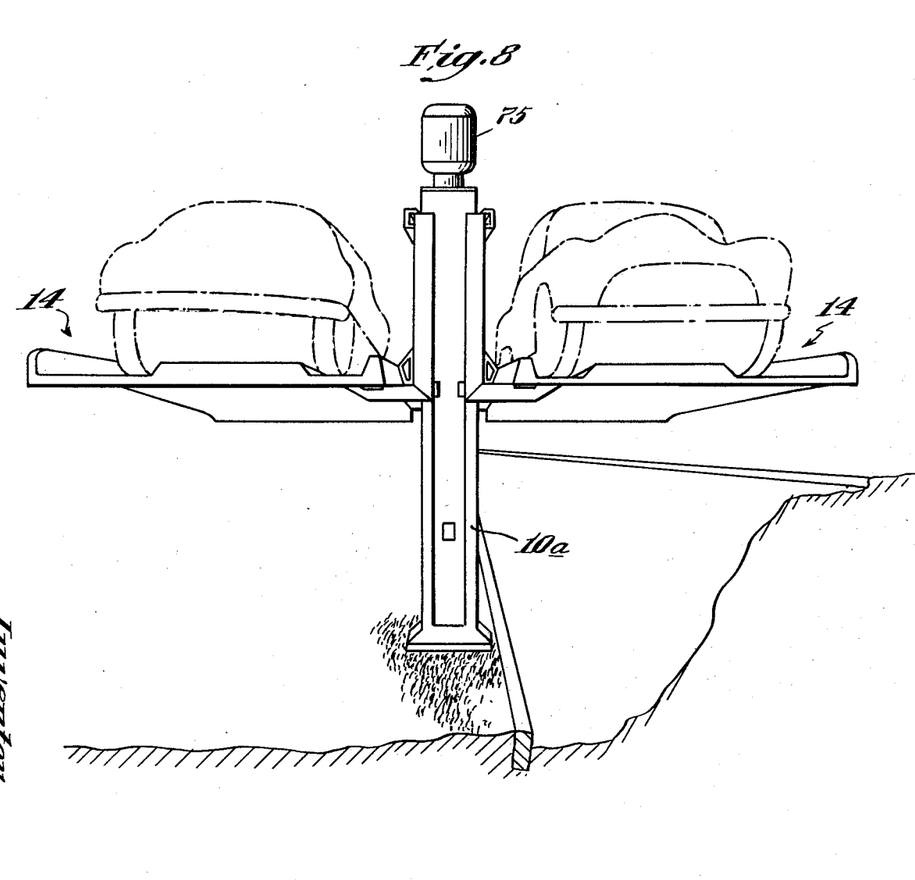
Fig. 8 is a view showing the automobile lifts as installed along the street curb.

A typical application of the revolving lift is illustrated in Fig. 8, wherein two automobiles are shown parked where no parking would ordinarily be permitted. The automobile elevated above the plot of grass was loaded when the platform was or'ginally on the street side of the curbing. After loading and elevation, the whole column and platform have been revolved through 180 degrees so that now the automobile is located over the grass as shown. The second platform was then loaded and elevated, and the automobile raised in position over the street. Sufficient height is provided between the street level and the elevated automobiles to allow other automobiles and trucks to pass underneath without hindrance. In this particular illustration, the available parking space has been doubled by use of the lift.

Particular fields of application to which the revolving lift may be adapted are numerous. Municipal governments could install the units on city-owned property and lease them to automobile owners on a monthly or yearly basis, which would provide additional revenue for the municipal governments and at the same time relieve the cancer of congestion that now threatens the city's survival. In many of the larger cities, the main thoroughfares are divided in their central portion by a plot of lawn commonly called an island. Ordinarily no parking is permitted adjacent to the island. If the revolving lift were applied to such a condition and placed on 23-foot centers along each side of the island, a total of forty automobiles could easily be parked on a block of 250 feet length—twenty automobiles being parked over the island and twenty over the street, which would in no way impede the normal flow of traffic and at the same time the advantages of increased parking area would have been achieved through the introduction of the lift.

The revolving lift can also be installed by the cities on the outskirts of the business districts so that shoppers coming into town are able to park their automobiles using the lift and then travel by bus, subway, or ferry to their destination. In this instance, the lift would be coin-operated to defray the costs and could be made much cheaper than the exorbitant rates now charged by many of the centralized parking lots. Indeed, the revolving lift can be placed anywhere a parking problem exists—even in the heart of the city. The only space requirement demanded is that there be at least a 12-foot clearance from the column to the edge of any building so that the platform may be revolved without interference.

I claim:

1. An automobile lift comprising a substantially vertical column having means at its lower end for mounting the column in an upright position upon a base, the column having flanges forming different sides of the column, at least two platforms for holding automobiles and disposed at opposite sides of the column, each platform exerting a turning moment on the column, supporting means for the respective platforms movable independently of each other vertically along adjacent sides of the platform, each supporting means having an upper member engaging the inner face of an opposed flange and a lower member spaced vertically from said first member and engaging the outer face of an opposed flange, whereby said members coact to transmit to the column the turning moment of the corresponding platform, a pair of flexible tension members at opposite sides of the column, each tension member being fixed at one end to the column and secured at the other end to the adjacent platform supporting means, a pair of vertically movable elements at opposite sides of the column and supporting the respective tension members intermediate said ends thereof, said elements being movable independently of each other and along the respective tension members, power-operated means for moving each of said elements vertically along the column and independently of the other elements so as to raise an automobile carried by the corresponding platform to an elevated position, the column including a vertical plate extending to each side of the column, each side having a pair of flanges extending in opposite directions from the adjacent vertical edge of the plate, each supporting means having at the upper portion thereof a yoke straddling said pair of flanges at the adjacent side, said upper member being mounted on the yoke, and engaging the inner face of one of said pair of flanges, and a second upper member on the yoke engaging the inner face of the other flange of said pair.

2. An automobile lift according to claim 1, in which the column includes a beam structure having a main vertical plate, secondary vertical plates spaced from each other and extending in opposite directions from the lateral edges of the main plate, and flanges at the lateral edges of the secondary plates, each supporting means being located opposite a side of the column formed by the pair of flanges at corresponding lateral edges of the secondary plates, said upper and lower members of the supporting means engaging the inner and outer faces, respectively, of one flange of said pair, and the supporting means including additional upper and lower members engaging the inner and outer faces, respectively, of the other flange of said pair.

3. An automobile lift according to claim 1, in which the column includes a beam structure having a main vertical plate, secondary vertical plates spaced from each other and extending in opposite directions from the lateral edges of the main plate, and flanges at the lateral edges of the secondary plates, each supporting means being located opposite a side of the column formed by the pair of flanges at corresponding lateral edges of the secondary plates, said upper and lower members of the supporting means engaging the inner and outer faces, respectively, of one flange of said pair, and the supporting means including additional upper and lower members engaging the inner and outer faces, respectively, of the other flange of said pair, and members on each supporting means engaging opposite faces of said secondary plates to guide the supporting means in its vertical movement on the column.

4. An automobile lift according to claim 1, in which the column includes a beam structure having a main vertical plate, secondary vertical plates spaced from each other and extending in opposite directions from the lateral edges of the main plate, and flanges at the lateral edges of the secondary plates, each supporting means being located opposite a side of the column formed by the pair of flanges at corresponding lateral edges of the secondary plates, said upper and lower members of the supporting means engaging the inner and outer faces, respectively, of one flange of said pair, and the supporting means including additional upper and lower members engaging the inner and outer faces, respectively, of the other flange of said pair, each power operated means including an element connected to the corresponding supporting means and extending along the space between said secondary plates.

References Cited in the file of this patent

UNITED STATES PATENTS

| | | |
|---|---|---|
| 1,554,584 | Lake | Sept. 22, 1925 |
| 1,619,360 | Miller | Mar. 1, 1927 |
| 1,937,189 | Buettell et al. | Nov. 28, 1933 |
| 2,242,891 | Light | May 20, 1941 |
| 2,320,600 | Howell | June 1, 1943 |
| 2,663,435 | Eliot | Dec. 22, 1953 |
| 2,667,983 | Billings | Feb. 2, 1954 |
| 2,682,958 | Francis | July 6, 1954 |

FOREIGN PATENTS

| | | |
|---|---|---|
| 701,586 | France | Jan. 12, 1931 |
| 499,000 | Great Britain | Jan. 17, 1939 |